July 16, 1968 C. C. GAMBILL 3,393,296
PLUG CONNECTED SENSOR FOR PLACEMENT ON SURFACE HEATERS
Filed Oct. 1, 1965 2 Sheets-Sheet 2
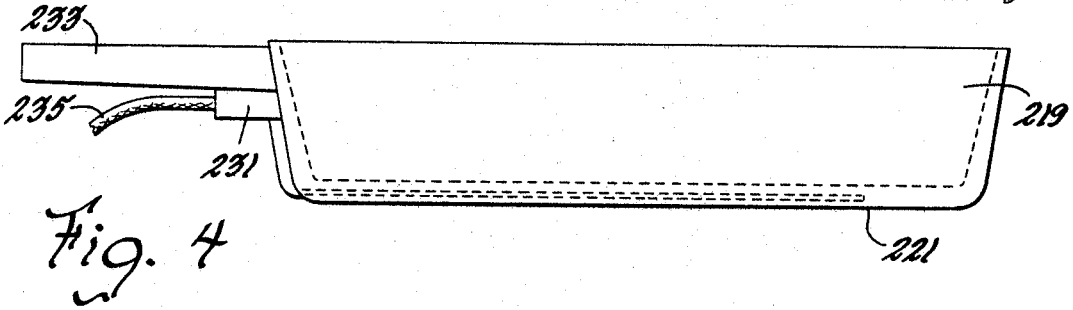
Fig. 4
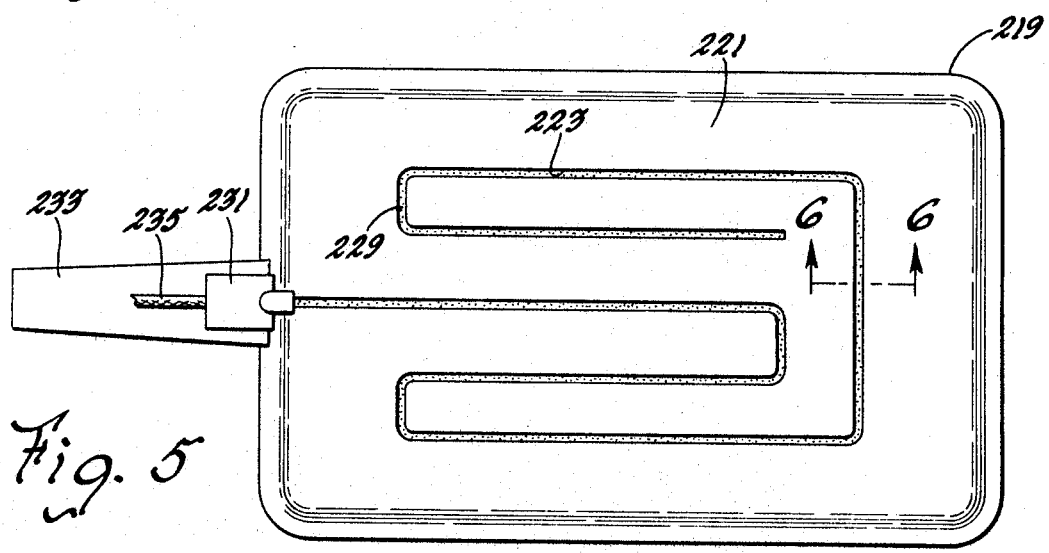
Fig. 5
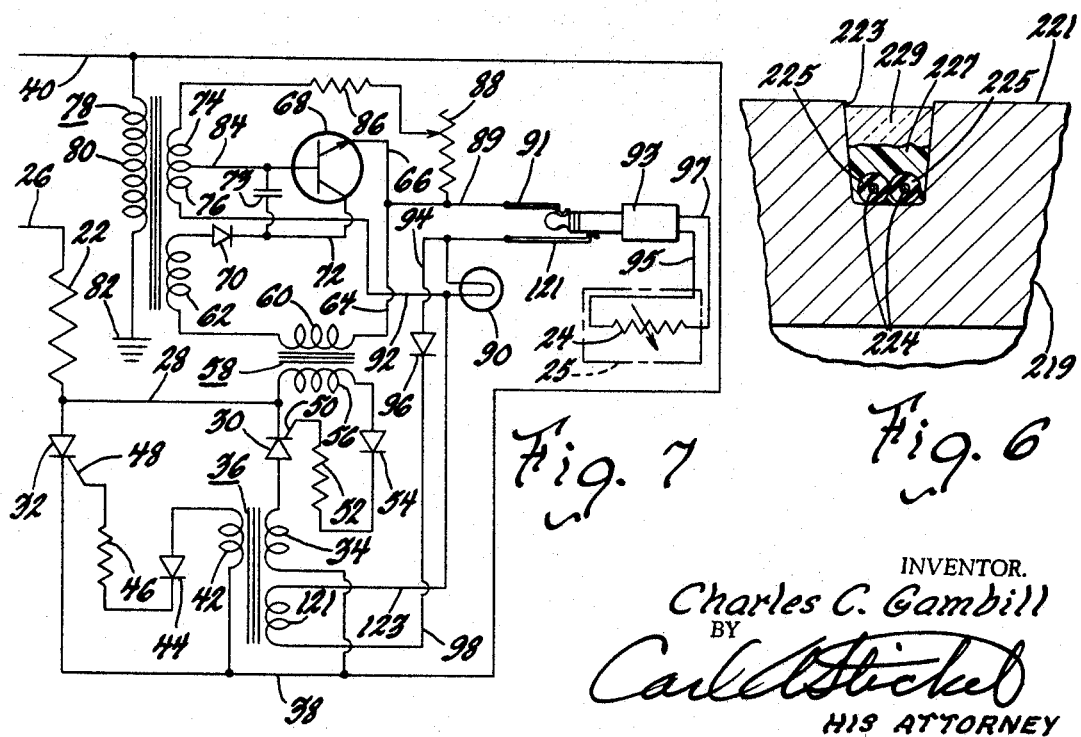
Fig. 7
Fig. 6
INVENTOR.
Charles C. Gambill
BY
Carl A. Stickel
HIS ATTORNEY

Header omitted 3,393,296
PLUG CONNECTED SENSOR FOR PLACEMENT ON SURFACE HEATERS
Charles C. Gambill, Tipp City, Ohio, assignor to General Motors Corporation, Detroit, Mich., a corporation of Delaware
Filed Oct. 1, 1965, Ser. No. 491,985
7 Claims. (Cl. 219—450)

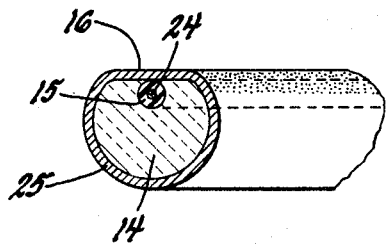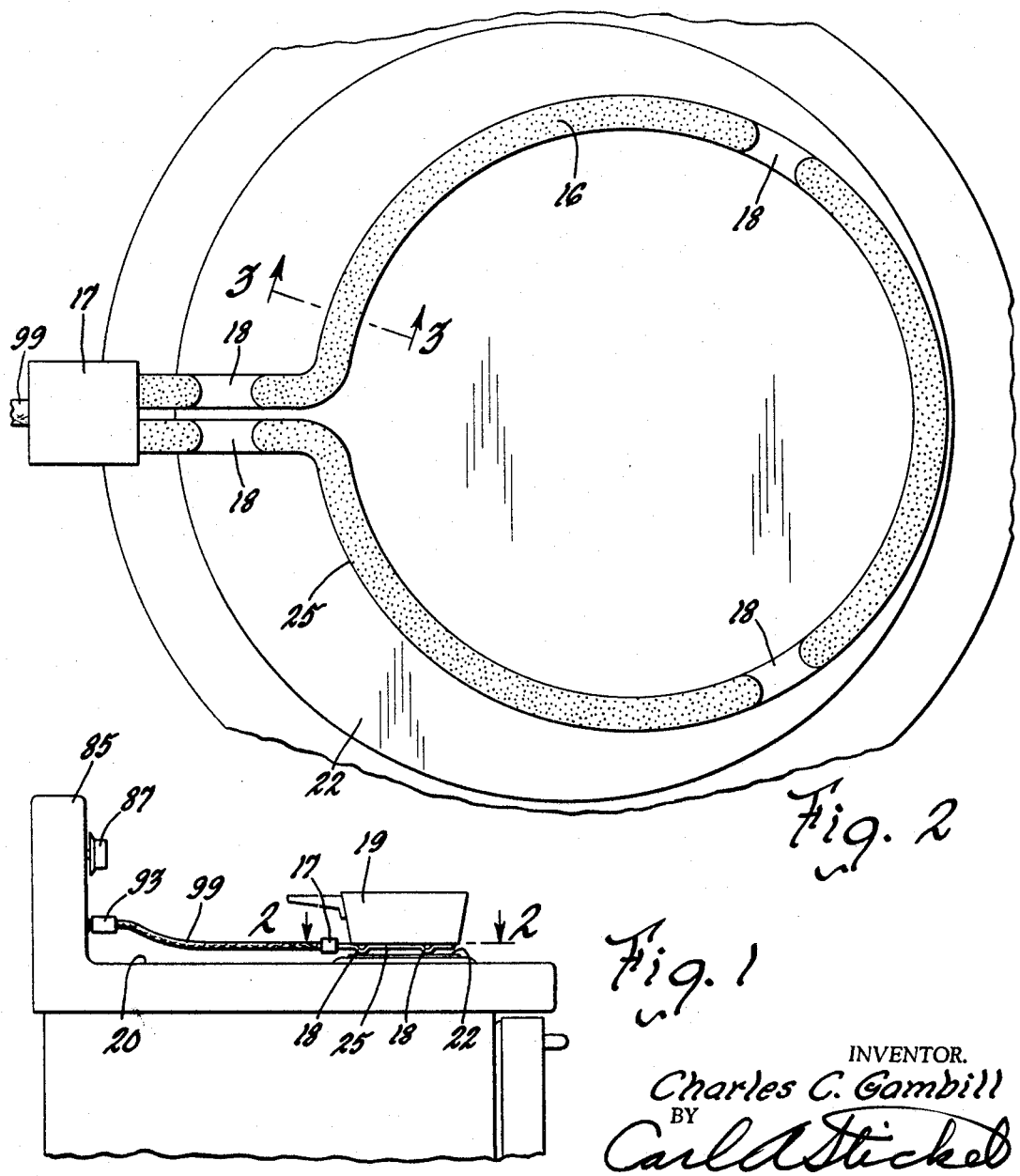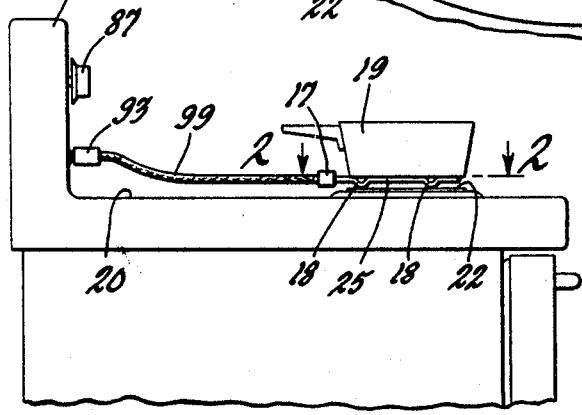

ABSTRACT OF THE DISCLOSURE

In the preferred form, a temperature responsive resistance wire is enclosed in a loop of metal tubing having a flat upper surface on which the cooking utensil is supported and having downwardly projecting supporting feet which can be supported on the flat top of plate type surface heaters. The resistance wire is connected by a flexible electrical conductor through a plug connection to a control circuit in an electric range which controls the energization of the flat top surface heaters in accordance with the temperature of the resistance wire. The temperature is selected by the adjustment provided in the control system. In the modified form, the temperature responsive resistance wire is incorporated in the bottom of the utensil itself and connected by flexible electrical conductors and the plug connection to the control system for the flat top surface heaters.

---

This invention pertains to electrical apparatus and more particularly to the control of surface heaters of electric ranges to the temperature of the cooking utensils.

Recently there has been considerable interest in flat plate types of surface heaters such as are shown in Patent 3,067,315 issued Dec. 4, 1962, Patent 2,955,190 issued Oct. 4, 1960 and Patent 3,110,795 issued Nov. 12, 1963. It is frequently desired to provide a thermostatic control responsive to the temperature of a cooking utensil for such a surface heater. However, conventional thermostatic controls for surface heaters have a thermostatic element projecting upwardly in the center of the surface heater which contacts the bottom of the cooking utensil. To apply the conventional temperature responsive control to the flat plate type of surface heater by placing the thermostatic element in the center thereof would provide a discontinuity in its flat surface and eliminate the advantage most readily apparent for this type of surface heaters.

It is an object of this invention to provide a temperature responsive control which is responsive to the temperature of a utensil which will not require any break or discontinuity in a flat type surface heater to be controlled thereby.

It is another object of this invention to provide a temperature responsive control which can be located between a flat plate type of surface heater and the cooking utensil supported over the surface heaters which will be responsive primarily to the temperature of the utensil.

These and other objects are attained in the forms shown in the drawings in which a temperature responsive resistance wire is enclosed in a loop of metal tubing having a flat upper surface on which the cooking utensil is supported and having downwardly projecting supporting feet which can be supported on top of the flat surface heaters. The resistance wire is connected by a flexible electrical conductor to a control circuit in the range which controls the energization of the flat surface heaters in accordance with the temperature of the resistance wire which is selected by adjustment provided in the control system. In a modified form the temperature responsive resistance wire is incorporated in the bottom of the utensil itself and connected by flexible electrical conductors to the control system for the flat surface heaters.

Further objects and advantages of the present invention will be apparent from the following description, reference being had to the accompanying drawings wherein preferred embodiments of the present invention are clearly shown.

In the drawings:

FIGURE 1 is a view in elevation of the top of an electric range provided with a flat top surface heater and a control system embodying one form of my invention;

FIGURE 2 is a fragmentary sectional view taken along the line 2—2 of FIGURE 1 illustrating the temperature responsive element of my invention located upon a flat top surface heater;

FIGURE 3 is a fragmentary sectional view taken along the line 3—3 of FIGURE 2;

FIGURE 4 is a view in elevation of a cooking utensil having in the bottom a temperature responsive resistance wire;

FIGURE 5 is a bottom view of the utensil shown in FIGURE 4;

FIGURE 6 is a fragmentary sectional view through a bottom portion of FIGURE 5, illustrating the temperature responsive resistance wire taken along the lines 6—6 of FIGURE 5; and, FIGURE 7 is a wiring diagram of the surface heater and control system.

Referring now more particularly to FIGURE 1, there is illustrated the top 20 of an electric range having thereon a flat top surface heater 22 which may be of the type shown in Patents 3,067,315, or 2,955,190 or 3,110,795, previously mentioned. To control the surface heater 22 in response to the temperature of any kitchen utensil such as the utensil 19 shown above the heater 22, I provide a loop shaped tube of aluminum or stainless steel having three or more downwardly extending projections 18 which support the remainder of the loop 25 and the terminal connection 17 away from the surface heater 22. The top portions of the tubing 25 are preferably flattened as indicated by the reference character 16 and also provided with a dull black finish by the formation of a black oxide coating or other coating so as to present a surface of high emissivity to the bottom of the utensil 19 and assuring that the tubing 25 will be preponderantly responsive to the temperature of the pan 19. The downwardly extending projections 18 as well as the bottom face of the tubing 25 are provided with a bright finish either through some form of polishing or bright plating to minimize absorption of heat from the surface heater 22. The projections 18 have substantially point contact with the top of the surface heater 22 so that there will be a minimum of conduction of heat therefrom to the tubing 25. The temperature responsive resistance wire 24 is covered with glass fiber electrical insulation 15 and for good conduction is preferably held in contact with the upper flat top of the tubing 25 by some form of heat insulation 14 such as glass fiber insulation which minimizes the heat flow from the bottom of the tubing 25 to the temperature responsive resistance wire 24.

As shown in FIGURE 7 one terminal of the heater 22 is connected to one 236-volt supply conductor 26 while the other is connected to a parallel circuit 28 containing the master silicon controlled rectifier 30 and the slave silicon controlled rectifier 32 arranged oppositely in parallel circuit with each other and in series with the surface heater 22. As shown the cathode of the master rectifier 30 and the anode of the slave rectifier 32 are connected to the surface heater 22. The anode of the master rectifier 30 is connected through the 6-turn winding 34 of the three winding transformer 36 with the conductor 38 connecting the cathode of the slave rectifier 32 with the second 236-volt supply conductor 40. The transformer 36 is provided with a second winding 42 of about 120 turns, having one terminal connected to the conductor 38 and the other terminal connected through a diode rectifier 44 and a fixed resistance 46 with the gate 48 of the slave rectifier 32. Whenever the master rectifier 30 fires or conducts for one-half cycle the current passing through the winding 34 will generate a higher voltage current in the winding 42 which is applied to the gate 48 to cause the slave rectifier 32 to fire or conduct the following half cycle.

The firing of the master rectifier 30 is controlled by the voltage applied to its gate 50 which is connected through a fixed resistance 52 and a rectifier diode 54 with the output winding 56 of a transformer 58. The second terminal of the winding 56 is connected to the conductor 28. When the voltage applied to the gate 50 is sufficiently positive relative to the conductor 28 connected to its cathode, the master rectifier 30 will be caused to conduct for one complete half cycle and through the transformer 36 will cause the slave rectifier 32 to conduct for the following complete half cycle.

The transformer 58 is provided with an input winding 60 having one terminal connected to the 6-volt output winding 62 and the other terminal connected through the conductors 64 and 66 with the emitter of the silicon transistor 68. The opposite terminal of the 6-volt output winding 62 is connected through the diode rectifier 70 and the conductor 72 to the collector of the transistor 68. The transistor 68 controls the flow of current through this transformer circuit to apply through the transformer 58, the diode rectifier 54 and the resistance 52 a variable voltage upon the gate 50 sufficient to cause the master rectifier 30 to either conduct or not to conduct throughout a complete half cycle.

The current flow through the transistor 68 is controlled by a bridge circuit energized from the dual output windings 74 and 76 of a transformer 78. The transformer 78 has a 110-volt input winding 80 connected between the conductor 40 and the ground 82 for energizing the output winding 62 at about 6 volts and each section 74 and 76 of the second output winding at about 3 volts. The terminal between the two sections 74 and 76 is connected by a conductor 84 to the base of the transistor 68. A capacitor 73 is connected between the conductors 84 and 72. A second terminal of the section 74 is connected through the fixed resistance 86 of about 15 ohms and through a manually controlled customer selected variable resistance 88 to the conductor 66 and a bridged conductor 89. The variable resistance 88 has a selective resistance of about 0–30 ohms. The customer selected variable resistance 88 may be adjusted by the knob 87 upon the back splash panel 85 of the range top 20.

The conductor 89 connects to a jack-plug receptacle 91 provided in the back splash panel 85 for receiving the jack-plug 93. The jack-plug 93 connects through a pair of flexible electrical conductors 95 and 97 with the terminal block 17 for connection with the opposite ends of the temperature responsive resistance 24 within the tubing 25. The flexible conductors 95 and 97 may be enclosed in a flexible sheathed conduit 99 extending between the jack 93 and the terminal block 17. The second terminal of the jack 93 connects through the other terminal 121 of the jack-plug receptacle in the back splash panel 85 to one terminal of a resistance in the form of tungsten filament automobile lamp 90 of 6 to 8 volts, two candle power which has its other terminal connected to the conductor 92. This conductor 92 connects to the second terminal of the output winding 76 to complete the bridge circuit.

After the variable resistance 88 is moved to select a resistance corresponding to the temperature of the pan which is to be reached and maintained, the bridge circuit will be unbalanced since the resistance of the resistance wire 24 to be substantially below the resistance corresponding to temperature selected and likewise its resistance will be substantially below the combined resistance of the resistance 86 and 88. This will cause the application of a positive base to emitter voltage to the transistor 68 which causes it to conduct through the transformer 58, the rectifier 54 and the resistance 52, to apply a voltage to the gate 50 sufficient to cause the master silicon controlled rectifier 30 to conduct for complete alternate half cycles as long as a sufficiently high voltage is applied to the gate 50. Through the transformer 36, there will be sufficient voltage applied to the gate 48 to cause the slave silicon controlled rectifier 32 to conduct for each complete alternate half cycle following each alternate half cycle that the master rectifier 30 conducts. This will cause the electric heater 22 to be energized with full wave alternating current until the bridge circuit becomes substantially balanced.

However, it has been found that the heat stored in the surface heaters during this rise in temperature is sufficient to cause an overshoot beyond the temperature selected by the adjustment of the knob 87 which adjusts the variable resistance 88 to the selected temperature. To minimize this overshoot I have arranged the 6–8 volt to candle power tungsten filament automobile lamp 90 as a variable resistance in series with the temperature responsive resistance 24. To accomplish this, one terminal of the lamp 90 is connected through the conductor 94, the diode 96 and the conductor 98 with the 125 turn second output winding 121 of the transformer 36 which supplies about two volts. The second terminal of the winding 121 is connected by the conductor 123 to the conductor 92 and to the second terminal of the lamp 90. This keeps the operation of lamp 90 at a very low level of illumination which varies in accordance with the conduction of current through the heater 22. The current passes through the heater 22 one hundred percent of the time during the initial portions of the warm-up period. The lamp 90 will likewise be energized to the maximum extent during this warm-up period which will cause it to have maximum resistance during this period. This maximum resistance when added to the increasing resistance of the temperature responsive resistance wire 24 will cause the bridge circuit to become balanced before the resistance 24 reaches the temperature selected by the adjustment of the variable resistance 88. The current flow through the lamp 90 and the temperature responsive resistance will then reduce in accordance with the reduction in current flow through the heater 22. Through this arrangement the tendency to overshoot is minimized and the heater 22 is controlled to bring the utensil 19 to the temperature selected by the knob 87 and retained at that temperature.

In the form shown in FIGURES 4–6, a rectangular shaped pan or griddle 219 has in its bottom surface 221 a groove 223 of the configuration shown in FIGURE 5. Within this groove 223 there is placed a loop of the same resistance wire which is described in conjunction with FIGURES 1–3. This second resistance wire 224 may be of the same size and metal as the resistance wire 24. It is similarly insulated with glass fiber electrical insulation 225. This temperature responsive resistance wire 224 is doubled upon itself to form a loop which lies in the groove 223 as shown in FIGURE 6. It may be held in place by the glass fiber material 227 or other suitable heat resistant metal. The wire 224 and the glass fiber material 227 is held in place by the high temperature ceramic type cement 229. As an alternative, the edges of the groove 223 may be peened over to hold the wire 224 in the groove 223. The wires 224 connect to a terminal 231 beneath the handle 223 which in turn is connected by a pair of flexible conductors within the flexible conduit 235 with the jack-plug 93 for connection with the control circuit of the surface heater 22 in such a manner similar to the temperature responsive resistance 24 as illustrated in FIGURES 1 and 7. Thus, through this arrangement, the control system is made responsive to the temperature of the utensil 219 in a manner somewhat similar to that illustrated in connection with the form shown in FIGURES 1–3. The control system shown in FIGURE 7 illustrates one specific example of a system which may be used with the temperature responsive resistances 24 and 224. These resistances 24 and 224 may also be used with other types of surface heater control systems.

While the embodiments of the present invention as herein disclosed, constitute preferred forms, it is to be understood that other forms might be adopted.

What is claimed is as follows:

1. A surface heater for an electric range top including a surface heating means having a generally imperforate surface upon said range top for heating a utensil located above the heating means, a control means for said surface heating means associated with said range top and having a plug type connection upon said range top, and a temperature sensing means responsive preponderantly to the temperature of the utensil and located between said surface heating means and said utensil and operatively connected to said plug type connection when in normal use for varying said control means to control said heating means.

2. A surface heater as specified in claim 1 in which said temperature sensing means constitutes a device separate from said surface heating means and said utensil but being supported over said surface heating means when in normal use and having means for supporting said utensil over said surface heating means.

3. A surface heater as specified in claim 1 in which said temperature sensing means constitutes a device separate from said surface heating means and said utensil but being supported over said surface heating means when in normal use and having means for supporting said utensil over said surface heating means, said temperature sensing means having an upper surface of high emissivity facing said utensil and a lower surface of low emissivity facing said surface heating means.

4. A surface heater as specified in claim 1 in which the temperature sensing means is adhered to the bottom of the utensil.

5. A surface heater as specified in claim 1 in which the temperature sensing means is in the form of a tube in the shape of a loop capable of supporting thereon the utensil.

6. A surface heater as specified in claim 1 in which the temperature sensing means is in the form of a tube containing an electrically insulated temperature responsive resistance having a flexible electrical connection with said plug.

7. A surface heater as specified in claim 1 in which the temperature sensing means is in the form of a tube having a flattened upper surface and a plurality of downwardly projecting supporting feet.

References Cited

UNITED STATES PATENTS

| 2,306,979 | 12/1942 | Potsdam | 219—449 |
| 2,311,087 | 2/1943 | Sandell | 219—449 |
| 2,530,643 | 11/1950 | Berg et al. | 219—450 X |
| 2,686,250 | 10/1954 | Schroeder | 219—504 X |
| 3,098,918 | 7/1963 | Koci et al. | 219—505 X |

FOREIGN PATENTS 957,284 2/1950 France.

RICHARD M. WOOD, *Primary Examiner.*

L. H. BENDER, *Assistant Examiner.*